Sept. 15, 1959 W. R. AIKEN 2,904,722

ELECTRONIC CONTROL SYSTEM

Filed May 16, 1957 5 Sheets-Sheet 1

INVENTOR.
WILLIAM R. AIKEN
BY [signature]
ATTYS.

Sept. 15, 1959 W. R. AIKEN 2,904,722

ELECTRONIC CONTROL SYSTEM

Filed May 16, 1957 5 Sheets-Sheet 2

INVENTOR.
WILLIAM R. AIKEN

BY Brown, Jackson, Boettcher & Dienner

ATTYS.

ELECTRONIC CONTROL SYSTEM

Filed May 16, 1957 5 Sheets-Sheet 3

INVENTOR.
WILLIAM R. AIKEN
BY Brown, Jackson, Boettcher & Dienner
ATTYS.

INVENTOR.
WILLIAM R. AIKEN
BY Brown, Jackson, Boettcher & Dienner
ATTYS.

INVENTOR.
WILLIAM R. AIKEN
BY Bair Jackson Bullbee & Dunner
ATTYS.

United States Patent Office 2,904,722
Patented Sept. 15, 1959

2,904,722

ELECTRONIC CONTROL SYSTEM

William Ross Aiken, Los Altos, Calif., assignor, by mesne assignments, to Kaiser Industries Corporation, a corporation of Nevada Application May 16, 1957, Serial No. 659,677

14 Claims. (Cl. 315—13)

The present invention is directed to a new and novel control system for cathode ray tubes, and more particularly to an electronic circuit for energizing the beam control elements of an Aiken-type flat cathode ray tube.

The flat cathode ray tube, which is known as the Aiken-type tube in the art, in its basic concepts, is comprised of a configuration which approximates that of a picture adapted for wall mounting, and is therefore particularly adapted for use in home television presentations. Such type tube was taught in detail in applicant's copending applications having Serial No. 355,965, which was filed May 19, 1953 and is now abandoned, Serial No. 396,120, which was filed December 4, 1953, and which issued as Patent No. 2,795,731 on June 11, 1957, and Serial No. 521,201, which was filed July 11, 1955, and now Patent No. 2,864,970, the present application is a continuation-in-part of each of these applications.

The numerous advantages and applications of this novel flat tube are well know to parties skilled in the art. Prominent among the features and advantages attendant of this general type are its overall compactness which permits the use thereof in smaller areas; extremely high definition and resolution which results from the inherently sharp electrostatic focus arrangement; the reduction in expensive components resulting from the use of only electrostatic deflection elements, and the elimination of high voltage deflection yokes, vertical and horizontal output transformers, magnetic deflection coils, and others of the bulky and expensive components incidental to the vertical and horizontal stages for use with cathode ray tubes now known in the art. The novel tube also is featured by the reduction in weight in its physical mass, and the minimization and simplification of adjustment of the tube for use in the desired application; its flexbility in adaptation to mounting in various positions and in association with other equipment, and its adaptability for use with other types of electronic and optical units. These, and other features and advantages, have been set forth only briefly herein, and numerous other features and advantages will doubtless be apparent to parties skilled in the art.

In the operation of an Aiken-type tube, selective areas of a phosphor screen are electronically excited by an electron beam. A pair of novel deflection arrays disposed at successive intervals along the beam path are energized to selectively deflect the beam into registration with the different points on the screen. The patterns and arrangement of such arrays and the path of the beam may vary in accordance with the design of the tube, as taught more fully in the above identified copending application.

In one particularly successful embodiment, an array of horizontal deflection elements is arranged to provide a field-free region along the lower horizontal edge of the phosphor screen, and the beam is delivered along a path adjacent thereto. Control means, one embodiment of which is set forth specifically hereinafter, effect the application of voltages to each of the horizontal deflection elements in sequence to effect the bending of the beam vertically at successive points along the edge of the tube, and into a second field-free region which extends between an array of vertical deflection elements and the electrically charged phosphor screen.

Deflection of the beam onto the screen at the different vertical levels is achieved by effecting the application of voltages of appropriate values to corresponding ones of the vertical deflection elements, such action being achieved through the employment of the aforementioned control means. Thus, it may be seen that selective positioning of the electron beam on the screen may be controlled by the application of voltages to the corresponding ones of the horizontal and vertical deflection elements, and it is a particular object of the present invention to provide a control arrangement for effecting simplified and reliable beam positioning by the novel deflection elements.

Inasmuch as the beam bending achieved by the horizontal deflection elements may be less than 90°, the marginal side edge of the resultant frame presented on the phosphor screen in certain embodiments may be slightly canted from the vertical. Such presentation is due to the fact that the beam has a substantial velocity vector in the direction of its initial travel as it is emitted from the electron gun assembly and travels along a path adjacent the horizontal deflection elements. The deflecting force applied to the beam by the horizontal deflection elements causes the beam to be deflected upwardly thereby giving the beam a velocity vector which is perpendicular to the initial vector. Although the latter force acting on the beam is relatively large with respect to the former, the beam will assume the path of the resultant of these two vectors, and in certain embodiments, the resultant path is not truly perpendicular to the initial direction of travel, and the sides of the resultant picture may be canted slightly relative to the vertical. Various means have been employed to satisfactorily straighten the resultant display so that it will assume a rectangular form, such as the so-called mechanical picture adjuster shown and described in the copending application, Serial No. 521,201, which was filed July 11, 1955. In such arrangement, the electron gun assembly and the horizontal deflection elements are, as a unit, slightly tilted with respect to the lower edge of the phosphor screen.

Another structure for effecting a rectilinear display comprises an electromagnetic means such as shown and described in applicant's copending application, Serial No. 525,649. In such arrangement an electromagnetic means provides a supplementary field which is effective with the field of the electrostatic deflecting means to effect a complete 90° deflection of the beam from its initial path and thereby a rectangular display on the phosphor screen.

It is a further object of this invention to produce an entirely electronic control system for effecting a rectangular display on the phosphor screen of an Aiken-type cathode ray tube.

Other objects and advantages will become apparent from the following detailed description and attached drawings in which.

Figure 1:
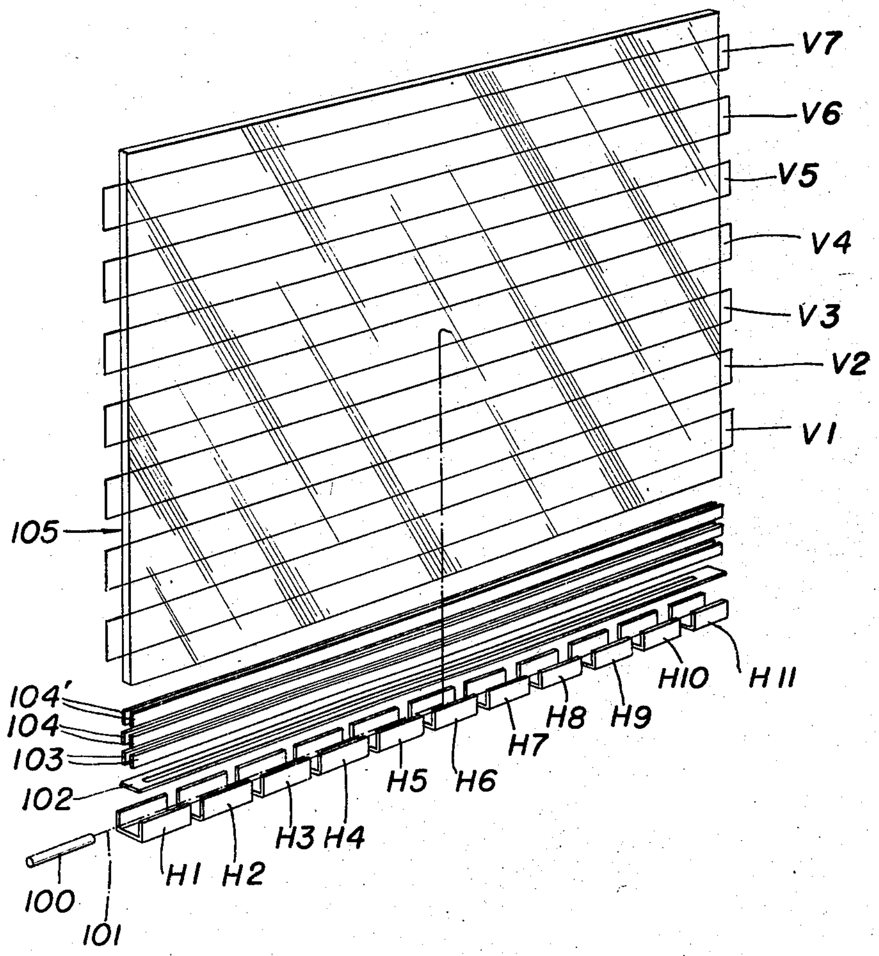
Figure 1 is a schematic illustration of an Aiken-type cathode ray tube showing the horizontal and vertical sweep control electrodes.

The Aiken tube as shown in Figure 1, includes an envelope (not shown) which is adapted to completely house the internal components of the tube. The tube basically comprises three sections including a primary section, a transition section, and a secondary or high voltage section. The primary section includes an electron source means 100, such as an electron gun, adapted to deliver an electron beam 101 along a predetermined path, a linear array of horizontal deflection elements H1 through H11, disposed along the initial predetermined beam path, and a slotted accelerator member 102 extending coextensively with the array of deflection elements to form a field-free region therewith for the beam path. The transition section includes a pair of accelerating electrodes 103 and a first and a second pair of focusing electrodes 104, 104' disposed between the primary and secondary sections. The secondary or high voltage section includes an image screen or target 105, and an array of substantially parallel deflection elements V1–V7 which are coextensive with the target and disposed in spaced parallel relation with the deflection elements V1–V7 to permit passage of the beam therebetween.

In operation, selective areas of the target 105 are electronically excited by the electron beam 101. In the illustrated arrangement of the tube, the electron gun 100 is located at the lower left hand corner of the target and is effective to deliver the beam 101 along the lower horizontal edge of the target in a field-free region adjacent the deflection elements H1–H11. The field-free region is suitably established by maintaining the slotted electrode 102 at substantially the same voltages as that initially applied to the deflection elements H1–H11, which voltage in the illustrated embodiment may be in the order of 800 volts. Control means, explained in detail hereinafter, are operative to selectively apply voltages over the illustrated conductors 106–116 to each of the deflection elements H1–H11 to effect bending of the beam 101 vertically at successive intervals along the edge of the tube, causing the beam to travel over successive adjacent paths through the transition section, and into a second field-free region which exists between the deflection elements V1–V7 and the target 105.

Deflection of the beam 101 into selective registration with the target 105 at the different vertical levels is achieved by effecting the application of voltages of appropriate values to corresponding ones of the deflection elements V1–V7. The application of the desired voltages is achieved by control means, explained in detail hereinafter, which are operative to selectively apply voltages over the illustrated conductors 120–126 to each of the deflection elements V1–V7. It is apparent from the foregoing description that the position of the beam 101 on the target 105 may be controlled by the synchronous application of the voltages to the corresponding ones of the deflection elements H1–H11 and V1–V7.

An important feature in the operation of the Aiken tube is the overlapping manner in which the control voltages are applied to the deflection elements of the horizontal array and also to the deflection elements of the vertical array. Briefly, by energization of the horizontal deflection elements to effect sweeping of the beam through the zone adjacent the vertical deflection elements, the control means cause the potential on each of the successive elements of the horizontal array to change from a first value to a second value, the changes in value being initiated on each successive deflection element in the array prior to completion of the change of potential on the previous deflection element in the array. The vertical deflection elements are energized in a similar manner, and such manner of energization is referred to hereinafter as an "overlapping" energization.

When the Aiken tube is employed for the presentation of a raster, such as in television reception, the control system is operative responsive to the receipt of each horizontal sync signal, to cause the horizontal deflection elements H1–H11 to cycle to sweep the beam through the area adjacent the target face. These elements are accordingly referred to as the horizontal deflection elements. The deflection elements V1–V7 are cyclically energized in a similar manner responsive to the receipt of each vertical sync signal and control the beam to register with successive vertical intervals on the screen. The deflection electrodes V1–V7 are therefore referred to as the vertical deflection elements. In the NTSC system, the horizontal sync signals are received at the rate of 15,750 pulses per second and vertical sync signals are received at the rate of 60 pulses per second.

Figure 2:
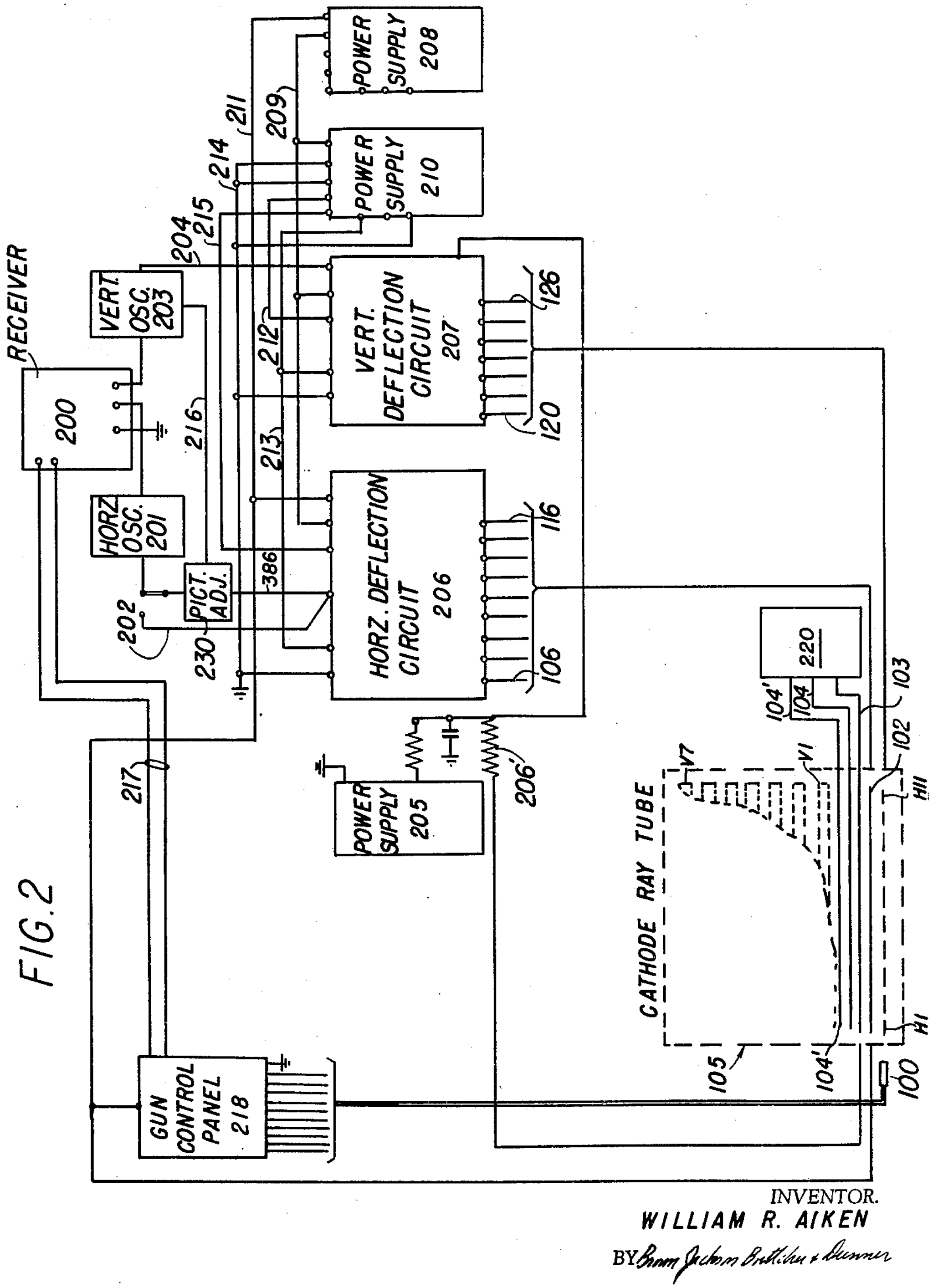
Figure 2 is a diagrammatic illustration in block form of a control system for energizing the electrodes of an Aiken-type cathode ray tube responsive to receipt of transmitted television signals.

The novel control system of the instant invention in its use in energizing deflection electrodes of an Aiken-type tube is schematically illustrated in Figure 2, and such figure specifically illustrates the manner in which the novel control system is energized by the output signals of the oscillator stages of a conventional television receiver circuit. For purposes of a more simplified explanation, the novel control circuit is illustrated in its operation with a conventional television receiver 200, such as a receiver chassis which is commercially available as Admiral No. 19A1, and the horizontal and vertical oscillator circuits of the commercial chassis are shown as the connecting stages between the novel control circuitry and the previous receiving stages of the chassis.

More specifically, as shown in Figure 2, the vertical and horizontal sync signal output of the commercial receiver chassis are connected in the conventional manner to the input circuits for the horizontal and vertical oscillator circuits 201, 203 respectively of the chassis. The output of the horizontal oscillator circuit 201 is coupled over a conductor 202 to the horizontal deflection circuit 206, and the output of the horizontal deflection circuit 206 is coupled over conductors 106–116 to the horizontal deflection plates H1–H11. The horizontal oscillator circuit 201 is operative with the receipt of each horizontal sync signal to apply a sawtooth signal to the horizontal deflection circuit 206, which is in turn operative to provide a signal output which cycles each of the horizontal deflection elements H1–H11 in sequence and in an overlapping manner.

The vertical oscillator circuit 203 is coupled over conductor 204 to the vertical deflection circuit 207, and is operative responsive to the receipt of each vertical sync signal from the receiver 200 to couple a sawtooth signal to the vertical deflection circuit 207. The output side of the vertical deflection circuit 207 is connected over conductors 120–126 to the vertical deflection plates V1–V7, and with the receipt of each sawtooth signal provides an output signal over conductors 120–126 for effecting the energization of each of the vertical deflection plates V1–V7 in sequence and in an overlapping manner.

The video signal, as detected by receiver 200, is coupled over conductor 217 and a positioning or control panel 218, to the electron gun 100 for the cathode ray tube.

The novel control circuit including the electron beam gun 100, horizontal deflection circuit 206, deflection electrodes H1–H11, vertical deflection electrodes V1–V7 and the target, respectively, are energized in the present arrangement by three commercially available power supply circuits 205, 208, 210. It is, of course, apparent that a single simplified power supply arrangement could be substituted therefor.

Briefly, power supply 205 couples 15 kv. potential over resistor 205' to the vertical deflection circuit 207, and over an additional resistor 206' to the target 105 of the cathode ray tube. The vertical deflection electrodes V1–V7 and the target 105 in the illustrated embodiment may be maintained at some less than 15 kv.

Power supply 208 and 210 are conventional 400 volt power sources, such as are commercially available as Universal Power Source 520A. The negative high voltage conductor of unit 208 is connected to the positive high voltage output of unit 210 over conductor 209 to provide an 800 volt output over the positive high voltage output terminal of power source 208. Such potential is extended over conductor 211 to the slotted electrode 102, and the horizontal deflection circuit 206, which as shown hereinafter, is utilized to energize the horizontal deflection electrodes H1–H11, and is also supplied to the gun panel.

Power supply 210 also provides a 400 volt potential over conductor 209 to the vertical deflection circuit 207, and the horizontal deflection circuit 206, such potential being utilized primarily for the purpose of energizing the plates of the control tubes in the respective circuits. Power supply 210 also provides a 250 volt negative output over conductor 212 to vertical deflection circuit 207; a 0–250 volt negative output over conductor 215 to the horizontal deflection circuit 206; and a filament potential of approximately 6.3 volts over conductor 213 to the horizontal and vertical deflection circuits 206, 207, respectively for filament current supply purposes. Power supply 210, as well as the vertical and horizontal deflection circuits 206, 207, are coupled over conductor 214 to ground.

A 5 kv. power supply 220 is connected as a supply source for the accelerating electrode 103, and the first and second focusing electrodes 104 and 104' which are energized at 1800 volts, 1–3 kv. and 1–3 kv., respectively.

A positioning panel 218 may be included to permit adjustment of the energizing potentials to the elements of a conventional electron beam gun 100.

An electronic adjuster circuit 230 may be utilized in adjusting the picture margins, and in such event, the input of the adjuster circuit 230 is connected to the outputs of the horizontal and vertical oscillators 201, 203, and the output of adjuster 230 is connected to the input circuit for the horizontal deflection circuit 206.

The manner in which the aforedescribed control circuitry is operative to control the beam in the provision of a television raster, and the manner in which the electronic picture adjuster is utilized to effect an improved picture trace are more fully described in detail hereinafter.

SPECIFIC DESCRIPTION

As noted above the sync signal output of a conventional receiver may be utilized to effect the presentation of a raster on the flat cathode ray tube. More specifically, the sync signal output of a conventional receiver is applied to the receiver horizontal oscillator which is operative responsive to receipt thereof to provide a 15,750 cycle sawtooth signal to the novel horizontal deflection circuit of the invention which in turn effects cyclic energization of the horizontal electrodes H1–H11 in an overlapping manner. In a similar manner, the vertical sync pulse output of the receiver is coupled to the receiver vertical oscillator to control same to provide a sawtooth signal which effects energization of the vertical deflection electrodes successively in an overlapping manner. The 15,750 cycle signal output of the horizontal oscillator effects energization of the horizontal deflection electrodes approximately 260 times for each cycling of the vertical deflection plates, and the vertical deflection plates are cycled twice in the presentation of each raster. In the present arrangement, each of the horizontal deflection elements H1–H10 is initially energized at 50 volts and during each cycle increased to approximately 800 volts. Each of the vertical deflection elements V1–V7 is initially energized at approximately 15 kv., and decreased during each cycle to approximately 1500 volts.

HORIZONTAL BEAM DEFLECTION CONTROL CIRCUITRY

A. *Horizontal oscillator*

Figure 3:
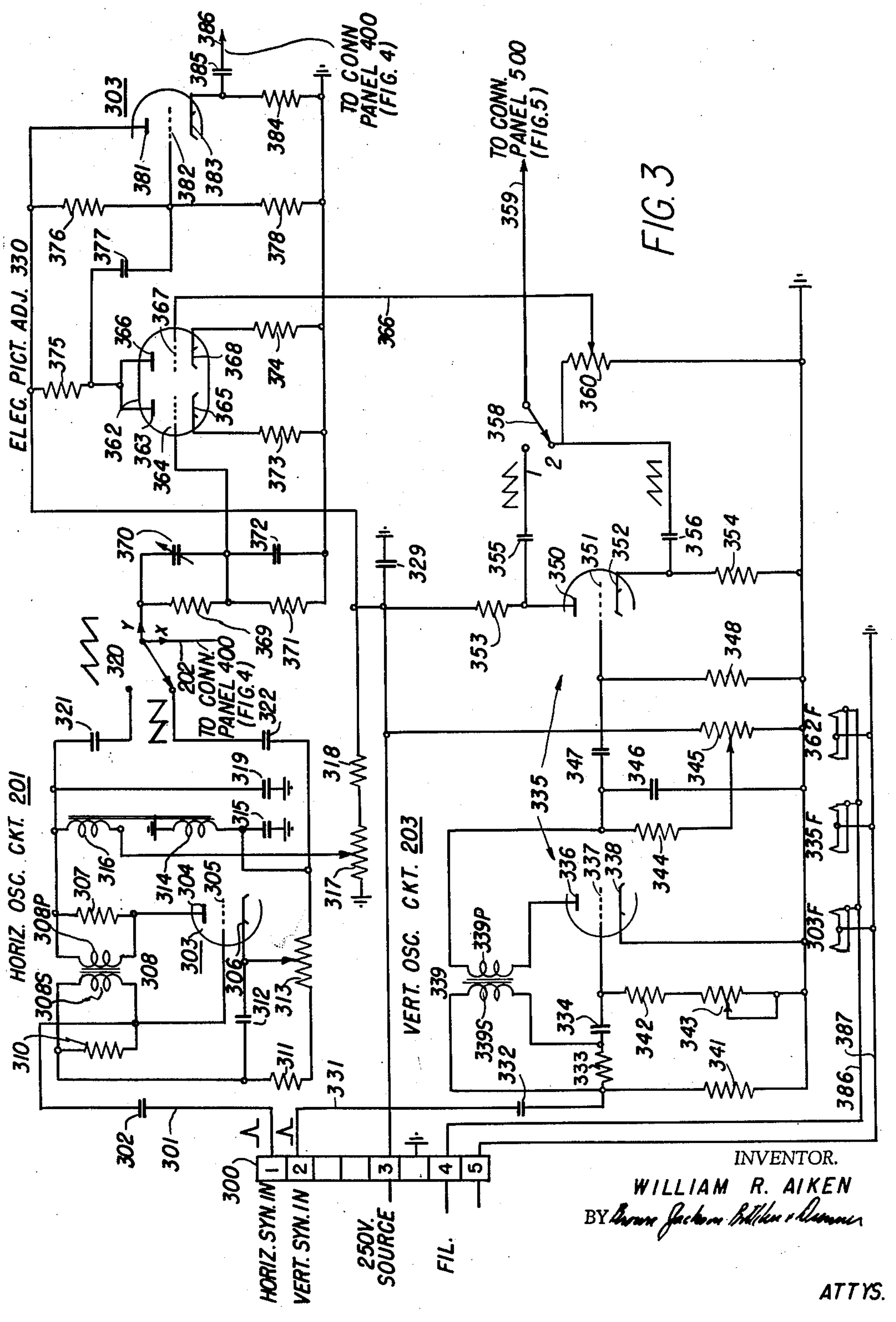
Figure 3 is a detailed showing of the horizontal and vertical oscillator circuit including the electronic picture adjuster shown in Figure 2.
Figure 4:
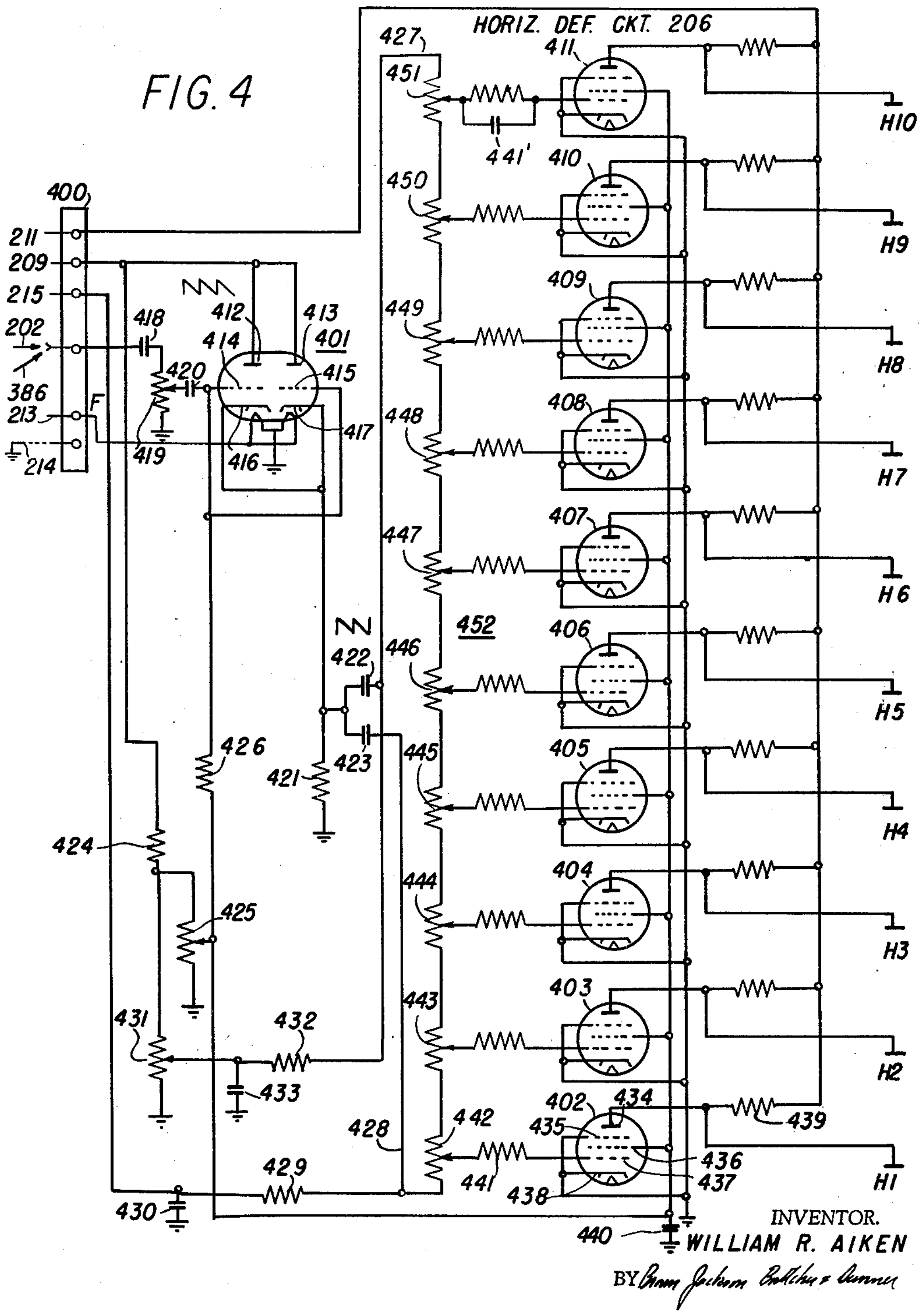
Figure 4 is a detailed illustration of the horizontal deflection circuit chassis for energizing the horizontal electrodes.

As shown in Figure 3, the sync signal from the sync stage of a conventional television chassis is applied over conductor 202 to the connecting panel 300 and the input circuit 301 for the horizontal oscillator circuit. The horizontal oscillator circuit illustrated is of the type included in the above identified commercial chassis, and as shown, comprises an input path including conductor 301 and coupling capacitor 302 for supplying energizing signals to the control circuit for a triode vacuum tube 303 (illustrated as the first section of a dual section triode in Figure 3, such as the type which is commercially available as a 12AU7) the first section having an anode 304, control grid 305 and cathode 306. The primary winding 308P of transformer 308 is connected across resistor 307 in the plate circuit of tube 303 to extend oscillatory control signals over the secondary winding 308S of the transformer to the input circuit for control grid 305. Damper resistor 310 is connected across transformer sections 308S. Cathode 306 is connected to ground over adjustable resistance 313 and transformer winding 314. The grid circuit is connected to the cathode circuit over the RC network comprised of resitances 311, 313 and capacitor 312. Capacitor 315 is connected between the cathode circuit and ground for high frequency oscillation dampening purposes.

The plate circuit of tube 303 is further connected over dampening capacitor 319 to ground, and also over transformer winding 316, resistors 317 and 318, and terminal 4 of connecting panel 300 to a 250 volt source. Capacitor 329 is connected between the source input and ground. Resistor 313 is adjustable for the purpose of varying the time for recharge of the plate 304 during each operation of the tube. Briefly stated, with the receipt of a positive sync pulse (as shown in Figure 3), over the input circuit to the control grid 305, the triode 303 is rendered more conductive and the voltage in the plate circuit is correspondingly reduced. The negative going pulse thus applied to the transformer primary 308P appears in the secondary 308S as a positive going pulse, which as applied to the control grid 305 renders the tube 303 fully conductive. With the tube fully conductive, the voltage in the plate circuit is constant, and the negative going pulse applied to the transformer is terminated. The sync pulse that initiated the conductivity of the tube is no longer present, and as the positive pulse applied to the control grid leaks off over the grid leak circuit 311, 313, 312, 314 to ground, the conductivity of the tube is progressively reduced and the voltage in the plate circuit begins to rise, the size of pulse being determined essentially by the setting on adjustable resistor 317 in the plate circuit. The rise of plate potential appears as a positive going pulse on the transformer primary winding 308P, and on the secondary winding 308S and control grid 305 as a negative going pulse. The tube is now biased substantially to cutoff. As the plate reaches its full potential value, the resultant pulse on the transformer winding terminates and as the negative bias applied to the control grid leaks off, the tube again approaches the conductive state. However the timing of the circuit is such that a subsequent horizontal sync pulse will be received prior to this time, and each subsequent cycle is initiated in timed relation with the sync pulse incoming to the receiver chassis. As noted above the horizontal oscillator illustrated in the present disclosure is a part of the receiver chassis commercially available as a 19A1 Admiral chassis, and the specific components and operation thereof are known in the art.

The output of the horizontal oscillator circuit 201 is obtained either over a first output circuit including coupling capacitor 321, and alternatively over a second output circuit including coupling capacitor 322. A two position selector switch 320 is connected for the purpose of effecting independent selection of the two circuits. A positive going sawtooth waveform is coupled over capacitor 321 to the first position of switch 320, and a negative going negative sawtooth wave is coupled over capacitor 322 to the second position of switch 320. As noted heretofore in the event that the electronic picture straightener is to be included in the circuit, the output of the horizontal oscillator is coupled by the switch 320 over the electronic picture adjuster circuitry 230 to the horizontal deflection system, and in such event Y wiring is used. In the event that the electronic picture adjuster circuit is not included, X wiring is utilized, and the selected output of the horizontal oscillator is extended by the selector switch 320 over conductor 202 to the connecting or input panel 400 for the horizontal deflection system.

B. *Horizontal deflection control system*

The horizontal deflection system basically comprises a connecting or input panel 400, a plurality of horizontal deflection tubes 402–411 for effecting the application of changing potential signals to deflection electrodes H1–H10, and a horizontal cathode follower control tube 401 connected to the output circuit of the horizontal oscillator circuit 201 for the purpose of coupling the output signals thereof to the control circuit for the horizontal deflection tubes 402–411, respectively. Connecting panel 400 includes a first terminal which is connected over conductor 211 to power source 208, a second terminal which is connected over conductor 209 to the 400 volt positive output of power source 210, a third terminal which is connected over conductor 215 to a 0–250 volt negative output of power source 210, a fourth terminal which is connected over conductor 202 to the selected signal output of the horizontal oscillator circuit, a fifth terminal which is connected over conductor 213 to the filament supply terminal of the power source 210, and a sixth terminal which is a ground connection for the horizontal deflection circuit.

The horizontal cathode follower is a two-section tube which may be of the type commercially available as a 5687, and may comprise anodes 412, 413, control grids 414 and 415 and cathodes 416 and 417, respectively. The anodes 412 and 413 are connected to the 400 volt B+ voltage source of power source 210 over conductor 209 and the second terminal of connecting panel 400. The control grids 414, 415 are connected over an input circuit comprised of a coupling capacitor 418, adjustable resistance 419, and coupling capacitor 420, and the fourth terminal of the control panel 400 and conductor 202 to the output of the horizontal oscillator 201. The cathodes 416 and 417 are connected over cathode resistor 421 to ground. The output of the two sections of the horizontal cathode follower tube 401 is extended over a coupling circuit comprising capacitors 422, 423 to a control circuit 452 for the horizontal deflection tubes 402–411. Grid resistor 426 is connected to voltage divider 424, 431 and potentiometer 425 which are in turn connected to the second terminal of connecting panel 300 and conductor 209 to the 400 volt output of power supply 210, to provide a predetermined bias for the control grids 414 and 415.

As noted heretofore, the signal output of the horizontal oscillator circuit 201 with the selector switch 320 in the illustrated position comprises a negative going sawtooth wave. Assuming a direct connection over the "X" wiring from the output conductor 202 of the horizontal oscillator circuit 201 to the input circuit for the horizontal cathode follower tube 401, the output signal of the horizontal cathode follower will be a negative going sawtooth waveform similar to that applied to the input circuit.

More specifically, with the application of negative going sawtooth waves at a frequency of 15,750 cycles over the input circuit consisting of coupling capacitor 418, adjustable potentiometer 419 and coupling capacitor 420 to the control grids 414 and 415, the horizontal cathode follower tube 401 is effective to provide over the output circuit connected to the cathodes 416, 417, respectively, a set of negative going sawtooth waves at a frequency rate of 15,750 cycles. The peak to peak value of the wavefront output is varied by adjustment of potentiometer 419.

The waveform output of the horizontal cathode follower 401 controls the operation of horizontal deflection tubes 402–411, such waveform being applied to the control grids 437 of such tubes over a control circuit 452 including series-connected potentiometers 442–451, and individual grid resistors 441 for each of the horizontal deflection control tubes 402–411. The control circuit including series-connected resistor circuit 442–451, is connected at one end over resistor 429 to the 50–200 volt negative input terminal on connecting panel 400 and at the other end is connected over resistor 432, the divider circuit including resistor 424 and adjustable resistor 431, to the 400 volt positive source on the second terminal of connector panel 400.

The supply circuits in the illustrated arrangement are adjusted to provide a voltage drop of approximately 25 volts across the control circuit, the values being approximately plus 10 volts and −15 volts at the opposite ends thereof. Capacitors 430 and 433 are connected between the supply circuits and ground as filter decoupling capacitors.

Each of the ten horizontal deflection tubes controls the voltage signal applied to an associated one of the deflection plates H1–H10; the eleventh deflection plate H11 is directly connected to ground, and a control tube is not required for the control thereof. Each of the horizontal deflection tubes 402–411 may comprise a beam power pentode tube commercially available as a 6AN5 including an anode 434, a suppressor grid 435, screen grid 436, control grid 437, and cathode 438. The anodes 434 of the ten horizontal deflection tubes 402–411 are connected over an associated anode resistor 439 to the 800 volt positive B plus source on the first terminal of the connector panel 400. Each of the horizontal deflection electrodes, such as H1, are connected between the tube anode, such as 434, and the associated anode resistor, such as 439, and each electrode is controlled in its energization by the associated one of the tubes 402–411. The suppressor grid 435 of each tube is connected to its associated cathode 438, the cathodes being connected to common ground. The screen grid 436 for each of the tubes 402–411 is energized by a voltage derived from the 400 volt source connected to the second terminal of connecting panel 400, the circuit extending therefrom over resistor 424 and adjustable resistor 425 to a common conductor extending to the screen grids 436. Capacitor 440 is connected between the common conductor and ground. The control grids 437 for each of the tubes is connected over an associated resistor 441 to an associated one of a plurality of the series connected potentiometer members 442–451.

For exemplary purposes, it will be assumed that a bias of approximately 10 volts positive is applied over conductor 427 to one side of the control network 452 and a 15 volt negative voltage is applied over conductor 428 to the other end of the control network 452 to thereby effect a 25 volt drop across the control circuit 452. It is further assumed, for purposes of example, that the conductivity of the tubes is substantially at cutoff when the control grid is at −4 volts, and that the bias normally applied to the grid 437 for the first horizontal deflection control tube 402' (the tube for controlling the plate H1—the horizontal deflection plate closest to the gun) as determined by the setting on the potentiometer 442 is approximately 9 volts negative; the bias voltage applied to the control grid of the second tube is approximately 8 volts negative; the bias voltage applied to the control grid for the third tube is approximately 7 volts negative; the bias voltage applied to the control grid of the fourth tube is approximately 6 volts negative; the bias voltage applied to the control grid of the fifth tube is approximately 5 volts negative; the bias voltage applied to the sixth tube is approximately 4 volts negative; the bias voltage applied to the control grid of the seventh tube is approximately 3 volts negative; the bias voltage applied to the control grid of the eighth tube is approximately 2 volts negative; the bias voltage applied to the control grid for the ninth tube is approximately 1 volt negative; and the bias voltage applied to the control grid for the tenth tube is approximately 0 volts. With the tubes 402–411 biassed substantially to cutoff, the value of the voltage in the plate circuits (and for the electrodes H1–H10) is approximately 800 volts.

The operation of the horizontal deflection circuit 206 responsive to receipt of a sync pulse from the receiver chassis 200 is now described.

Briefly with the application of a sync pulse to the horizontal oscillator circuit 201, and the resultant coupling of the first negative going sawtooth waveform to the control grids 414, 415 of the horizontal cathode follower 401, a negative going sawtooth wave is applied over capacitors 422—423 to the control circuit 452 for the horizontal deflection control tubes 402–411. Assuming that the waveform output of the cathode follower tube is approximately 10 volts from peak to peak, it is apparent that with the application of the leading edge of the wavefront (approximately 10 volts) to the control grids of tubes 402–411 each of the tubes is rendered substantially conductive. With the tubes 402–411 fully conductive, the potential on the plate circuits thereof will be reduced correspondingly, and the value of the voltage on the electrodes H1–H10 is approximately 50 volts. It is apparent that as the beam first leaves the gun and sees the 50 volt potential on the first horizontal deflection plate H1 (a substantially negative value relative to slotted accelerator 102 which is at 800 volts) and the beam is bent substantially 90° relative to its path into the zone between the vertical deflection plates V1–V7 and the target 105.

As the time interval of the applied sawtooth signal increases, the signal applied to the control circuit 452 for the horizontal deflection control tubes 402–411 becomes increasingly more negative, and the control grids for the tubes, such as 402, are biased increasingly more negative. The conductivity of the tube, such as 402, is reduced a corresponding amount, and the voltage on the plate 434 increases a corresponding amount. The beam as it leaves the gun now sees an increasingly more positive voltage on the first plate H1, and the point of its deflection from the initial path moves farther away from the gun.

Since the negative going waveform is applied simultaneously to the control grids for each of the control tubes 402–411, and the grids of each successive tube in the sequence is biassed more positive than the preceding tube by a predetermined amount, it is apparent that as the applied signal becomes more negative, successive tubes will become less conductive and the value of the voltages on the successive electrodes will be increased in a similar manner at the successive time intervals. In the illustrated embodiment moreover the control grids are biassed to effect a change in the conductivity of at least one successive tube in the sequence prior to completion of the cycling of the tube previous thereto in the sequence to thereby effect an overlap in the cycling of adjacent tubes in the sequence, and a corresponding overlap in the potential changes effected on the adjacent horizontal deflection electrodes. As successive electrode members in a sequence are thus energized in an overlapping manner, a resultant field is created which moves across the plates in a direction away from the gun. The beam "sees" the resultant force of the moving field and is deflected from its path at successive intervals by the moving field and into the area between the vertical deflection plates and the target.

As the trailing edge of the negative going slope of the waveform is applied to the input conductors 427—428 for the control circuit, most or all of the horizontal control tubes will have been biassed substantially to cutoff, and the beam will have been moved through the zone between the target and the vertical deflection electrodes to its point of deflection most remote from the gun.

The manner in which the vertical deflection electrodes are energized with the horizontal deflection electrodes to effect selective registration of the beam with the target, and particularly to provide a raster thereon, will now be described.

VERTICAL DEFLECTION CONTROL SYSTEM

With brief reference to Figure 1, the registration of the beam 100 with different vertical coordinates on the target 105 is effected by initially establishing a negative field at the upper limit of the beam travel between the vertical deflection plates V1–V7 and the target 105 to bend the beam from its path into registration with the target at the upper marginal edge, and as each horizontal sweep is completed, moving the deflecting field downwardly one interval toward the lower edge of the target to bring the beam into registration with successive vertical intervals on the target. The manner in which the moving deflecting field is established by the vertical deflection electrodes V1–V7 is now set forth.

In accordance with accepted television procedure, a sync pulse is applied to the horizontal oscillator circuit 201 and the vertical oscillator circuit 203 simultaneously to initiate each frame scan. The receiver chassis 200 in the present disclosure is connected to apply such pulse to the vertical oscillator over connecting panel 300, conductor 331, and coupling capacitor 332 to the vacuum triode tube 335 which is connected as a vertical oscillator, and is operative in response to the vertical sync signal to provide a negative going sawtooth wave signal for the purpose of energizing a vertical cathode follower tube 350 in the vertical deflection circuit 207. The vertical deflection circuit 207 in turn effects energization of each of the vertical deflection electrodes V1–V7 in squence and in an overlapping manner.

A. *Vertical oscillator*

The vertical oscillator discolsed herein is the unit included in the above identified commercial chassis, and basically comprises a vacuum triode amplifier tube 335 connected as a blocking oscillator including a plate 336, control grid 337, and cathode 338. In the illustrated embodiment the tube 335 comprises the first section of a vacuum tube commercially available as a 12AU7. An input circuit extending from the connecting panel 300 couples the sync pulse from the television chassis over conductor 331, coupling capacitor 332, grid resistor 333, coupling capacitor 334, to control grid 337 of tube 335. Charging resistor 341 and grid resistors 342, 343 are coupled between the control grid circuit and ground. Primary winding 339P of transformer 339 is connected in the plate circuit for the oscillator tube 335, and the secondary winding 339S is coupled across resistance 333 in the input circuit for the control grid 337. Plate 336 of tube 335 is connected to 250 volt positive voltage over the primary winding 339P, resistors 344 and 345, the latter resistor being adjustable to permit variation of the size of the oscillator circuit. The output of the oscillator circuit is coupled over capacitor 347 to the control circuit of the second section of the dual triode 335. Capacitor 346 is coupled between the oscillator output circuit and ground.

The operation of the vertical oscillator circuit is well known in the art, and will be readily understood with reference to the previous description relative to the horizontal oscillator circuit 201. The waveform output is similar in shape to the output signal derived from the plate circuit of the horizontal oscillator tube 303. The second section of the dual triode 335 is connected to provide alternative output signals, the signal waveform output corresponding in shape to the alternative output signals provided by the horizontal oscillator circuit 201 to selector switch 320.

Briefly plate 350 is connected over plate resistor 353 to the 250 volt source, the control grid 351 is coupled over capacitor 347 to the output of the first section of tube 335 and the cathode 352 is coupled over resistor 354 to ground. Grid resistor 348 is connected between the control grid 351 and ground. The filaments of the horizontal and vertical oscillator tubes are energized from the power source 210 over conductors 386, 387, 303F, 335F.

The first output circuit includes a coupling capacitor 355 connected in the plate circuit of the second section of tube 335, and the second output circuit includes a capacitor 356 connected in the cathode circuit of the second section of tube 335.

Selector switch 358 is adjustable between two positions to select the alternative outputs of the vertical oscillator circuit. As explained more fully hereinafter the particular output utilized is dependent upon the particular corner of the target at which the gun is mounted. With the gun in the position disclosed in Figures 1 and 2, the positive going output obtained over the second position of selector switch 358 (the illustrated position) is utilized to effect the desired beam control. In such position the output of the vertical oscillator consists of a positive going waveform, such as shown adjacent the plate circuit for the second section of tube 335.

The waveform output is coupled over the connecting block 500 for the vertical sweep arrangement 207, the signals being applied each 1/60 of a second to accomplish 60 vertical sweeps each second, and thereby effect tracing of 30 rasters a second. For purposes of illustration, it will be assumed that the amplitude of the waveform output varies 10 volts between peaks.

B. *Vertical deflection control system*

Figure 5:
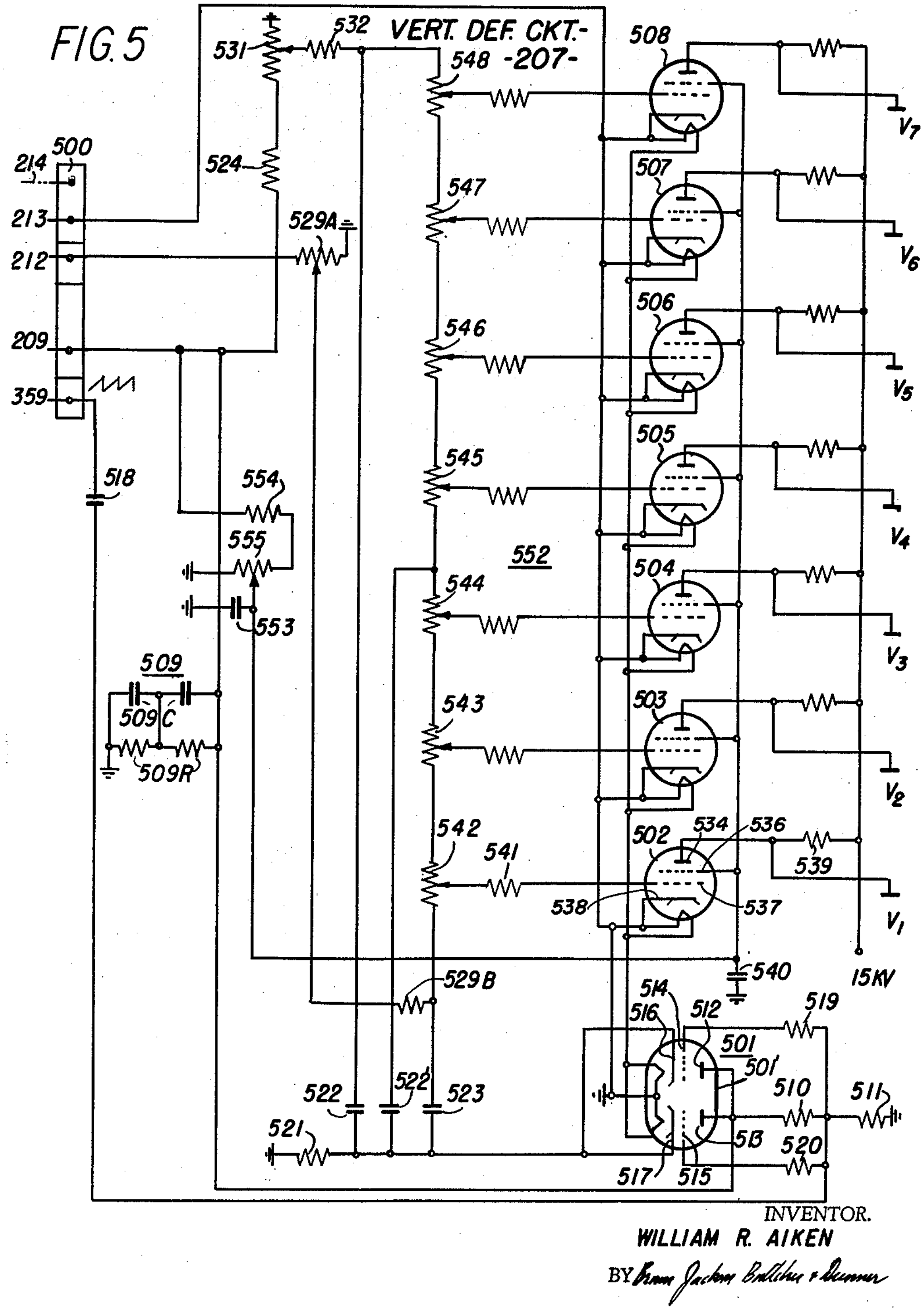
Figure 5 is a schematic showing of the vertical deflection circuit chassis for energizing the vertical electrodes.

The vertical sweep chassis 207 (Figure 5) which is controlled by the signal output of the vertical sweep oscillator 203 basically comprises a cathode follower circuit 501 for responding to the incoming signals, a set of vertical sweep control tubes 502–508, and a control circuit 552 for coupling the output of cathode follower circuit 501 to vertical sweep control tubes 502–508 to control same in the application of deflection potentials to the vertical deflection electrodes V1–V7.

The cathode follower circuit 501 basically comprises a high gm twin triode tube 501', such as the triode vacuum tube commercially available as a 12AT7, and includes a pair of anodes 512, 513, a pair of control grids 514, 515, and a pair of cathodes 516, 517. The anodes 512, 513 are connected to 400 volt positive battery over the third terminal of the connecting panel 500, an RC filter network 509 including resistor 509R and capacitor 509C being connected between the plate circuit and ground to filter ripple frequencies. The anodes 512 and 513 are also connected over load resistors 510, 511 to ground. The control grids 514, 515 are connected to the output circuit of the vertical oscillator 203 over the fourth terminal of connecting panel 500 and an input circuit comprised of capacitor 518 and grid resistors 519 and 520. The grid control circuit is also connected over load resistor 510 to the plates 512, 513 of the tube. Cathodes 516, 517 are connected over resistor 521 to ground. The output of the cathode follower circuit is coupled over coupling capacitors 522, 522', 524 to both ends and the middle of control circuit 552 for the vertical deflection electrode control tubes 502–508.

Control circuit 552 basically comprises a network of series connected resistances 542–548, one terminal of which is connected to 400 volt source over input conductor 209, the connecting panel 500 and resistance members 524, 531, 532; the second end terminal being connected over conductor 212, connecting panel 500 and resistor 529A, and 529B to the negative 250 volt potential source.

The vertical deflection control tubes 502–508 which are controlled by control circuit 552 are connected to couple variable value potential signals to the deflection electrode V1–V7. Each of the control tubes 502–508 basically comprises an anode 534, a screen grid 536, a control grid 537 and a cathode 538, such tube being of the type set forth in the copending application to William Ross Aiken, which was filed June 21, 1954, and which was assigned Serial No. 437,981. Each anode 534 is connected over an associated plate load resistor 539 to a 15 kv. source, and the associated deflection electrode V1–V7 for each of the tubes is connected in the circuit between the anode 534 and its plate load resistor 539. The screen grid 536 for each of the tubes is connected to the 400 volt positive voltage source over conductor 209, the third terminal of the connecting panel 500, and the voltage divider circuit comprised of resistors 554, 555 whereby a voltage of approximately 60 volts is applied to the screen grid. Capacitors 553 and 540 are connected between the screen circuit and ground for filtering purposes. Each of the control grids 537 of each of the tubes 502–508 is connected over an associate resistance, such as 541, to a corresponding one of the series connected resistances 542–548 in the control circuit 552 for the deflection tubes. The cathodes 538 are connected to ground over an obvious path.

It is first assumed for exemplary purposes that a bias of approximately 13 volts minus is applied over resistor 529B to one terminal end of the control circuit 552 and a bias of approximately 2 volts positive is applied over resistor 532 to the second terminal end of the control network 552 to thereby effect approximately a 15 volt drop across the control circuit 552. It is further assumed for purposes of example that the conductivity of the tubes is substantially at cutoff when the control grid is at minus 4 volts, and that the bias normally applied to the grid 537 for the first vertical deflection control tube 502 (the tube for controlling the plate V1 . . . the lower vertical deflection plate of the array) as determined by the setting on potentiometer 542 is approximately 9 volts negative, and that the bias voltage applied to each successive control grid in the sequence is reduced one volt. Thus the control grid 537 for the control tube 508 associated with plate V7 will be substantially at 3 volts negative.

The resistors 539 are selected so that whenever the tubes 502–508 are biassed substantially to cutoff, the value of the voltage in the plate circuits for the tubes (and for the electrodes V1–V7) is somewhat less than 15 kv., and whenever the tubes 402–411 are fully conductive, the value of the voltage in the plate circuits (and for the electrodes V1–V7) is approximately 1500 volts.

The operation of the vertical deflection circuit 207 responsive to receipt of a sync pulse over conductor 359 from the receiver chassis 200 is now described. Briefly, it is apparent that prior to receipt of a control pulse that the seventh tube 508 associated with the vertical electrode V7 will be slightly conductive, and the control tubes 502–507 associated with electrodes V1–V6 will be substantially biassed to cutoff. Thus as the beam is bent by the horizontal deflection electrodes H1–H11 from successive points on its initial path and into the zone between the vertical deflection electrodes V1–V7 and target 105, the beam will first see the field-free region which is established between the vertical deflection electrodes V1–V6 and the target 105 and advance to a position adjacent the uppermost deflection electrode V7. In that tube 508 associated with deflection electrode V7 is slightly conductive at the beginning of the cycle, the voltage which appears on deflection electrode V7 is negative with respect to the target, and the beam is initially bent into registration with the uppermost vertical coordinate of the target. It is apparent that as the horizonal plates H1–H11 are cycled in sequence the first line of the raster is traced.

It will be recalled that a vertical sync pulse is applied to the vertical oscillator circuit 203 simultaneous with the application of the sync pulse to the horizontal oscillator circuit 201. The vertical oscillator circuit 203 responsively generates a sawtooth waveform (positive going in the illustrated setting of switch 358) of approximately 10 volts peak to peak value which is applied over conductor 359 to the input side of vertical deflection circuit 207, the vertical cathode follower 501′, control circuit 552 and the control grids 537 for control tubes 502–508. As noted heretofore the vertical sawtooth pulse has a time duration which is approximately 260 times that of the sawtooth waveform output of the horizontal oscillator 201, and accordingly the vertical deflection electrodes V1–V7 are cycled once for approximately 260 cycles of the horizontal deflection electrodes.

As the waveform signal output of the vertical oscillator circuit 203 becomes more positive, the bias applied to the control grids 537 for control tubes 502, 508 becomes more positive, and the seventh tube 508 becomes more conductive, and the sixth tube 507 becomes slightly conductive. As a result the voltage on deflection electrode V7 is made more negative, and the voltage on deflection electrode V6 becomes slightly negative with respect to the target. The resultant field thus provided by the deflection plates V7–V6 results in the deflection of the beam into registration with a correspondingly lower vertical coordinate of the target.

It is apparent that as the wavefront becomes more positive at successive time intervals, successive ones of the tubes in the sequence become conductive, and the previous tubes in the sequence become more conductive. As the changing voltages appear on the successive electrodes V7–V1 in an overlapping manner, the beam sees the voltage as a moving field which descends across the face of the target, and is bent into registration with the target at successively lower vertical coordinates, the advance being made in synchronized relation with the line traces as effected by cycling of the horizontal electrodes H1–H11. As the waveform signal reaches its peak, each of the tubes 502–508 are biassed substantially to full conductivity, and the lower line of the raster will have been traced. The vertical trailing edge of the waveform is then applied, and the tubes 502–508 are restored to their original condition.

There is set forth hereat as a specific teaching the values of the components which were used in the successful reproduction of commercially broadcast television signals.

Horizontal oscillator circuit 201—Admiral chassis 19A1
Vertical oscillator circuit 203—Admiral chassis 19A1

Horizontal deflection circuit 206:
- Capacitor 420—.5 μfd. 600 v.
- Capacitors 433, 418—.1 μfd. 600 v.
- Capacitors 422, 423—.2 μfd. 600 v.
- Capacitor 430—.1 μfd. 600 v.
- Capacitor 440—20 μfd. 250 v.
- Capacitor 441′—47 μμfd. 500 v.
- Tube 401—5687
- Tubes 402–411—6AN5
- Resistor 424—10K, 50 w.
- Potentiometer 431—50K, 2 w.
- Resistor 426—1.8M, 2 w.
- Potentiometer 425—10K, 50 w.
- Resistors 432, 421, 429—11K, 2 w.
- Potentiometers 442–451—2K, 1 w.
- Resistor 441—47K, ½ w.
- Resistor 439—50K, 10 w.
- Potentiometer 419—.25M, ½ w.

Vertical deflection circuit 207:
- Resistor 539—(94M, 40 w.) 20 x 470K, 2 w.
- Resistor 511—10M, 2 w.
- Resistors 519, 520—100 ohm, ½ w.
- Resistor 510—1.2M, ½ w.
- Resistor 541—10K, 1 w.
- Potentiometers 542–548—50K, 2 w.
- Resistor 532—47K, 1 w.
- Potentiometer 529A—.1M, 2 w.
- Potentiometer 531—50K, 2 w.
- Resistor 524—150K, 2 w.
- Resistor 554—35K, 10 w.
- Potentiometer 555—5K, 4 w.
- Resistor 509R—150K, 2 w.
- Resistors 521, 529B—47K, 2 w.
- Capacitor 540—20 μf.
- Capacitors 553, 509C—8 μf.
- Capacitor 522, 522′, 523—2 μf.
- Tubes 502–508—6IT6
- Tube 501′—12AT7

ELECTRONIC PICTURE ADJUSTER

As earlier noted, the resultant picture in certain embodiments may be slightly canted from the vertical, and various arrangements, including a magnetic picture adjuster, have been proposed for the purpose of adjusting the picture to a true vertical position. According to a feature of the invention, the present arrangement contemplates the utilization of an electronic picture adjuster which basically consists of a simplified circuit arrangement adapted to mix a signal derived from the vertical oscillator output with the signal output of the horizontal oscillator, whereby the resultant bending forces are applied to the beam along its horizontal path at points successively removed from the gun as successive lines of the raster are traced.

The electronic picture adjuster 230 basically comprises a twin section triode vacuum tube 362, such as the tube commercially available as a 12AU7, connected as a mixer tube for mixing the output of the horizontal oscillator and a representative signal derived from the vertical oscillator, and a triode vacuum tube which may be a separate tube, or as illustrated in the present arrangement, the second section of a twin triode tube, such as 303, the first section of which was connected in the horizontal oscillator section 201.

The twin triode mixer tube includes a pair of anodes 363, 366, a pair of control grids 364, 367, and a pair of cathodes 365, 368. The anode members 363, 366 are connected to a 250 volt positive B+ voltage in the receiver which is extended over the fourth terminal of the connecting panel 300 and plate load resistor 375 to the anode member 363, 366. The cathodes 365, 368 are connected over cathode resistors 373, 374 respectively to ground. The control grid 364 for the first section of mixer tube 362 is connected over an associated divider circuit 369, 371, including capacitor 370, 372 to the switch arm 320 for selective connection to alternative output circuits of the horizontal oscillator 201.

A signal derivation circuit including adjustable potentiometer 360 is connected between the output circuit for vertical oscillator 203 and ground, and the adjustable arm thereon is connected to the control grid 367 of the second section of the mixer tube 362. The output circuit of the mixer tube 362 is coupled over capacitor 377 and voltage divider 376, 378 to the control grid of the second section of tube 303 which is connected as a cathode follower.

Cathode follower tube 303 includes a plate 381, control grid 382 and cathode 383. The anode 381 of the cathode follower tube 303 is connected to the 250 volt positive B+ supply over the fourth terminal of connecting panel 300, and the cathode 383 is connected over cathode resistor 384 to ground. The output of the cathode follower is extended over coupling capacitor 385 to the input terminal for the horizontal deflection system.

Assuming that the electronic picture adjuster circuit 330 is to be included in the disclosed circuit for use with the disclosed tube, the selector switch 320 is moved to its first position to couple positive going pulses to the grid 364 of mixer tube 362, whereby the required negative going impulses are obtained for the horizontal deflection circuit 206.

The positive going signal output of the vertical oscillator circuit 203 which is applied over coupling capacitor 356 and conductor 359 to the vertical deflection circuit 207 also appears across potentiometer 360, and the positive going signal derived thereby is applied to the control grid 367 of the second section of the mixer tube 362. The value of the derived signal applied to the grid 367 may be varied by suitable adjustment of the sliding arm on potentiometer 360.

The mixed signal output of the two sections of mixer tube 362 is applied over coupling capacitor 377 to the control grid 382 of cathode follower 303, and the output signal of cathode follower 303 is applied over capacitor 385 and conductor 386 to the horizontal deflection circuit 206 which in the illustrated arrangement comprises a negative going sawtooth signal.

In the absence of the receipt of a signal from the horizontal oscillator circuit 201, the first section of mixer tube 362 is substantially nonconductive, and a maximum potential signal appears in the plate circuit thereof. As the first positive going output signal is coupled from the horizontal oscillator circuit 201 to the grid 364 for the first section of mixer tube 362, the potential in the plate circuit is reduced in a related manner, and a negative going waveform is provided in the plate circuit thereof. In the absence of a signal from the vertical oscillator circuit 203, the second section of mixer tube 362 is substantially nonconductive, and accordingly the maximum potential signal appears in the plate circuit thereof. Since the pulse applied to the second section of the mixer tube is positive going, it is apparent that the value of the potential signal in the plate circuit of the second section of mixer tube 362 is at a maximum value during the period that the first lines of the raster are traced, and that the negative going pulses which are provided by the output circuit of the first section of the mixer tube 362 are increased by such value.

As the successive lines of the raster are traced the output of the vertical oscillator circuit 203 applied over potentiometer 360 to the control grid 367 for the second section of the mixer tube 362 increases, the conductivity of the second section of tube 362 increases, and the potential in the plate circuit of the second section decreases. Thus the value of each of the horizontal pulse signals as reproduced in the common output circuit of the mixer circuit are reduced progressively as the raster trace progresses.

In practice, the electronic picture adjuster 230 is adjusted to provide an output signal over conductor 386 to the horizontal deflection circuit 206, which is of a value as the last lines of the raster are being traced to maintain the first tube of the horizontal deflection circuit 206 substantially at cutoff, whereby the initial deflection of the beam from its horizontal path along the marginal edge of the target during the last lines of the trace is accomplished by the second horizontal deflection electrode H2. Since the value of the signal applied to the horizontal deflection circuit 206 is changed concurrently with each successive line trace, it is apparent that with each successive line trace the point of deflection of the beam from its path along the marginal edge of the target is moved a corresponding interval away from the gun, and in this manner the point of initial registration of the beam in each line trace is brought into vertical alignment with the point of initial registration of the beam in its trace of the first line of the raster. It is apparent that the slanting marginal edges of the picture may thus be adjusted to a desired vertical margin.

Electronic picture adjuster 230:
- Resistor 369—820K, ½ w.
- Resistor 371—100K, ½ w.
- Resistors 373, 374—5.1K, 1 w.
- Resistor 375—18K, 2 w.
- Resistor 376—10M, 1 w.
- Resistor 378—470K, ½ w.
- Resistor 384—8.2K, 2 w.
- Capacitor 370—5/50 APC
- Capacitor 372—.0005 μfd., 400 v.
- Capacitor 377—.01 μfd., 600 v.
- Capacitor 385—.1 μfd., 400 v.
- Tube 362—12AU7
- Tube 303—½ 12AU7

It is apparent that the order of energization of the electrodes H1–H11 and V1–V7 will vary with the position of the electron gun 100. That is, in the illustrated arrangement the electron gun 100 is positioned at the lower left hand corner of the target, and the horizontal deflection electrodes H1–H11 are energized in the order H1–H11 and the vertical deflection electrodes are energized in the order of V7–V1. With the electron gun 100 positioned in the upper right hand corner of the target (and considering the horizontal electrode closest to the gun as horizontal electrode H1) the horizontal deflection electrodes are energized in the order H11–H1, and the vertical electrodes are energized in the order V7–V1 as in the present arrangement. In such arrangement, the selector switch 320 would be adjusted to its first position. The order of energization of the electrodes in other arrangements of the electron gun 100 are obvious therefrom.

Further, the manner in which the basic concept of utilizing a signal derived from the vertical oscillator circuit in mixing the same output of the horizontal oscillator to accomplish picture adjustment in tube embodiments wherein the gun is positioned at different ones of the corners will be obvious from the foregoing disclosure.

While there has been described what is regarded to be preferred embodiments of the invention, it will be apparent that various changes, rearrangements and modifications may be made therein without departing from the scope of the invention as defined by the appended claims.

What is claimed is:

1. A control system for an array of deflection electrodes for deflecting the beam from different intervals of a predetermined path comprising a control circuit for each deflection electrode, control means connected in each of said control circuits operative responsive to the application of different voltages thereto to vary the voltage applied to its associated electrode, signal means for simultaneously applying a voltage signal of progressively different values at progressive time intervals to each of said control means to effect the variation of the conductivity of each of said control means through a predetermined range, and bias means for applying a biasing force to each of said control means to preadjust the range of the voltages required to effect the change of conductivity of each of said control means throughout said predetermined range, different value biasing forces being applied to the different control means to effect operation of the different control means at successive time intervals of said signal.

2. A control system for an array of deflection electrodes for deflecting the beam from different intervals of a predetermined path comprising a control circuit for each deflection electrode, a control tube including a control grid connected in each of said circuits operative responsive to the application of different voltages to said control grid to correspondingly vary the voltage applied to its associated electrode, signal means for simultaneously applying a voltage signal of progressively different values at progressive time intervals to each of said control grids to effect the change of conductivity of each of said control tubes through a predetermined range, and grid bias means for applying a biasing force to each of said control grids to preadjust the value of the signal required to effect the change of conductivity of each tube through said predetermined range, different biasing forces being applied to different control grids to effect operation of the different control means at successive time intervals of said signal.

3. A control system for an array of deflection electrodes disposed along at least an interval of a beam path comprising a control circuit for each deflection electrode, control means in each path for varying the current conductivity in each circuit to thereby vary the voltage applied to the associated electrode, and bias means for preadjusting each of said control means to initiate and terminate conductivity of said control means in each circuit responsive to receipt of a signal of a predetermined value, different control means being adjusted to effect current conductivity at successive time intervals responsive to the application of a signal of a progressively different value simultaneously to each of said control means.

4. A control system for an array of deflection electrodes disposed along at least an interval of a beam path to control deflection of the beam therefrom comprising a control circuit for each deflection electrode, control means in each control circuit for varying the current conductivity thereover to thereby vary the voltage applied to the associated electrode bias, means for preadjusting each of said control means to initiate conductivity in each control circuit responsive to receipt of a signal of a predetermined value, different control means being adjusted to initiate current conductivity with the application of a signal of a progressively different value, and signalling means for simultaneously coupling a control signal to said different control means to initiate conductivity of each of said control means at successively different times of said signal in an overlapping manner.

5. A control system for an array of deflection electrodes disposed along at least an interval of a beam path to control deflection of the beam therefrom comprising a control circuit for each deflection electrode, control means in each control circuit for varying the current conductivity therein to thereby vary the voltage applied to the associated electrode, bias means for preadjusting each of said control means to terminate conductivity in each circuit responsive to receipt of a signal of a predetermined value, different control means being adjusted to terminate current conductivity with the application of a signal of a different value, and signalling means for simultaneously coupling a control signal to said different control means to terminate conductivity of each of said control means at different relative times to thereby effect a change in the value of voltage applied to adjacent deflection electrodes in an overlapping manner.

6. A control system for an array of deflection electrodes disposed along intervals of a beam path to control deflection of the beam therefrom comprising a control circuit for each deflection electrode, control means for each of said circuits operative responsive to the application of different signals thereto to correspondingly vary the current conductivity in each circuit, and thereby the voltage applied to its associated electrode, means for applying a biasing potential to each of said control means to preadjust the value of the signal required to adjust the control means between the conductive and non-conductive condition thereof, different biasing potentials being applied to different control means to effect a change of the condition of the successive control means responsive to the application of a signal of a successively different value, and bias means for applying to said different control means simultaneously a control signal of a changing value to effect initially a change of the condition of at least one of said control means, and thereafter a change of the conditions of each of the successive control means, in an overlapping manner.

7. A control system as set forth in claim 6 which includes individual bias adjustment means for each of said control means for individually adjusting the bias potential applied to each of said control means.

8. A control system for an array of deflection electrodes disposed along a beam path for deflecting the beam from said path at different intervals comprising a control circuit for each deflection electrode, a control tube including a control grid connected in each of said control circuits operative responsive to the application of different signals to said control grid to vary the conductivity of the tube in said control circuit and thereby the voltage applied to its associated electrode, signal means for applying the vertical leading edge of a sawtooth waveform signal to said control grids simultaneously to effect a predetermined condition of conductivity by said tubes and thereafter applying the variable slope portion of said signal to said control grids commonly to effect a change of conductivity of each tube throughout a predetermined range, and grid biasing means for applying different biasing forces to the different control grids to establish a difference in the time of conductivity of the successive tubes through said range responsive to the application of different intervals of said variable signal.

9. A control system for energizing a first and a second array of deflection electrodes to control the position of registration of an electron beam on an associated target comprising a first set of control members, bias means for each of said control members adjusted to effect operation of different control members at different times responsive to the coupling of a changing value signal to said control members to correspondingly vary the voltage applied to the different electrodes in the first array and thereby the horizontal coordinate of beam registration with the target, a second set of control members, bias means for each member of said second set of control members adjusted to effect operation of different ones of said second set of control members at different times responsive to the coupling of changing value signal to correspondingly vary the voltage applied to the different electrodes in the second array and thereby the vertical coordinate of beam registration over the target, a first signal means for applying the signal of a changing value to said first control means, and a second signal means for applying the signal of a changing value to said second control means in synchronized relation with said second signal means to thereby control said first and second control means to effect registration of the beam with the point on the target indicated by the applied signals.

10. A control system for an array of deflection electrodes disposed along a beam path for deflecting the beam from said path at different intervals comprising a control circuit for each deflection electrode, a control tube including a control grid connected in each of said control circuits operative responsive to the application of different signals to said control grid to vary the conductivity of the tube in said control circuit and thereby the voltage applied to its associated electrode, signal means for applying the slope of a positive going sawtooth waveform signal to said control grids simultaneously to progressively effect a change of conductivity by each of said tubes through a predetermined range in an overlapping manner, and thereafter applying the vertical trailing edge of said signal to said control grids commonly to bias a plurality of said tubes to a predetermined condition of conductivity prior to receipt of a subsequent signal, and grid biasing means for applying different biasing forces to the different control grids to establish the change of the conductivity of the successive tubes through said range reponsive to the application of different intervals of the slope of said signal.

11. A control system for energizing a first and a second array of deflection electrodes to control an electron beam in the provision of a raster on an associated target comprising a first control means operative responsive to receipt of a first signal to cyclically vary the voltage applied to each of the electrodes in the first array in an overlapping manner to thereby effect sweeping of the beam through a zone adjacent the target, a second control means operative responsive to receipt of a second signal to correspondingly vary the voltage applied to each of the different electrodes in the second array in an overlapping manner to thereby bend the beam from said zone into registration with successive intervals on said target, a first signal means including a horizontal oscillator circuit for applying said first signal to said first control means, a second signal means including a vertical oscillator circuit for applying said second signal to said second control means, and sync means for effecting application of said first and second signals to said first and second control means in synchronized relation to effect the tracing of a raster on the target by said beam.

12. A control system for energizing a first and a second array of deflection electrodes of a cathode ray tube to control an electron beam in the provision of a raster on an associated target comprising a first control means operative responsive to receipt of a first signal to cyclically vary the voltage applied to each of the electrodes in the first array in an overlapping manner to thereby effect sweeping of the beam through a zone adjacent the target, a second control means operative responsive to receipt of a second signal to correspondingly vary the voltage applied to each of the different electrodes in the second array in an overlapping manner to thereby bend the beam from said zone into registration with successive intervals on said target, a first signal means including a horizontal oscillator circuit for applying said first signal to said first control means, a second signal means including a vertical oscillator circuit for applying said second signal to said second control means, sync means for effecting application of said first and second signals to said first and second control means in synchronized relation to effect the tracing of a raster on the target by said beam, and means for adjusting the marginal edges of the raster to a vertical position including means for deriving a linearly proportional signal from the output of said vertical oscillator circuit, and means for mixing the derived signal with the output of said horizontal oscillator circuit prior to application thereof to said first control means.

13. A control system as set forth in claim 12 which includes a first and a second output circuit for said horizontal oscillator circuit, a first and a second output circuit for said vertical oscillator circuit, and switch means for alternatively selecting the different output circuits for use in accordance with the position of the deflection arrays in a cathode ray tube.

14. A control system for an array of deflection electrodes disposed along at least an interval of a beam path comprising a control circuit for each deflection electrode, control means connected in each of said control circuits operative responsive to the application of different voltages thereto to correspondingly vary the voltage applied to its associated deflection electrode including means in each control circuit for controlling the different control means to initially operate in response to the application of voltages of different values thereto, a common input circuit for said control circuits, and signal means for applying a signal of progressively different voltage values at progressive time intervals to said common input circuit for said control means to effect the change of conductivity of each of said control means at correspondingly different time intervals.

References Cited in the file of this patent

UNITED STATES PATENTS

| | | |
|---|---|---|
| 2,500,431 | Potter | Mar. 14, 1950 |
| 2,558,019 | Toulon | June 26, 1951 |
| 2,766,400 | Clark | Oct. 9, 1956 |
| 2,820,175 | Fulini | Jan. 14, 1958 |
| 2,821,657 | Newhouse | Jan. 28, 1958 |